(12) United States Patent
Szell

(10) Patent No.: US 11,575,449 B2
(45) Date of Patent: Feb. 7, 2023

(54) COMMUNICATION UNIT FOR AN ELECTRICAL MACHINE TOOL, ELECTRICAL MACHINE TOOL SYSTEM AND METHOD

(71) Applicant: Robert Bosch GmbH, Stuttgart (DE)

(72) Inventor: Istvan Szell, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 383 days.

(21) Appl. No.: 15/760,761

(22) PCT Filed: Sep. 7, 2016

(86) PCT No.: PCT/EP2016/071037
§ 371 (c)(1),
(2) Date: Aug. 2, 2018

(87) PCT Pub. No.: WO2017/045980
PCT Pub. Date: Mar. 23, 2017

(65) Prior Publication Data
US 2018/0331768 A1  Nov. 15, 2018

(30) Foreign Application Priority Data

Sep. 17, 2015 (DE) ..................... 10 2015 217 826.9

(51) Int. Cl.
*H04B 11/00* (2006.01)
*B25F 5/00* (2006.01)
*B25B 21/00* (2006.01)

(52) U.S. Cl.
CPC ................ *H04B 11/00* (2013.01); *B25F 5/00* (2013.01); *B25B 21/00* (2013.01)

(58) Field of Classification Search
None
See application file for complete search history.

(56) References Cited

U.S. PATENT DOCUMENTS 4,001,773 A * 1/1977 Lamel .................... E21B 47/16
367/82
4,314,365 A * 2/1982 Petersen ................. E21B 47/16
175/56
(Continued)

FOREIGN PATENT DOCUMENTS

CA  2765605 C  * 10/2013  ............... E21B 4/14
CN  1251793 A      5/2000
(Continued)

OTHER PUBLICATIONS

International Search Report corresponding to PCT Application No. PCT/EP2016/071037, dated Jan. 2, 2017 (German and English language document) (5 pages).

*Primary Examiner* — Isam A Alsomiri
*Assistant Examiner* — Jonathan D Armstrong
(74) *Attorney, Agent, or Firm* — Maginot, Moore & Beck LLP

(57) ABSTRACT

A communication unit for an electrical machine, in particular a hand-held machine tool, includes at least one electrical actuator, a control unit configured to control the at least one electrical actuator, and a receiving unit assigned to a mobile or stationary unit. The at least one electrical actuator and the control unit together form a transmission unit. The transmission unit is configured to transmit data, and the receiving unit is configured to receive the data. The receiving unit includes at least one microphone. To transmit data, via the transmission unit, the control unit is configured to trigger the electrical actuator to generate an acoustic signal that is detectable by the at least one microphone.

10 Claims, 2 Drawing Sheets

(56) References Cited

U.S. PATENT DOCUMENTS

| | | | | |
|---|---|---|---|---|
| 4,351,029 | A * | 9/1982 | Maxey | G01N 3/58 |
| | | | | 702/34 |
| 4,642,618 | A * | 2/1987 | Johnson | B23B 49/001 |
| | | | | 340/683 |
| 5,166,908 | A * | 11/1992 | Montgomery | E21B 47/26 |
| | | | | 367/165 |
| 5,307,263 | A * | 4/1994 | Brown | A61B 5/6896 |
| | | | | 600/301 |
| 5,721,546 | A * | 2/1998 | Tsutsumishita | G01D 5/24409 |
| | | | | 341/116 |
| 5,897,493 | A * | 4/1999 | Brown | A61B 5/0002 |
| | | | | 600/300 |
| 5,899,855 | A * | 5/1999 | Brown | A61B 5/0002 |
| | | | | 600/301 |
| 6,211,775 | B1 * | 4/2001 | Lee | G08B 6/00 |
| | | | | 340/407.1 |
| 6,607,041 | B2 * | 8/2003 | Suzuki | B25B 21/02 |
| | | | | 173/11 |
| 6,696,814 | B2 * | 2/2004 | Henderson | B23P 19/066 |
| | | | | 318/807 |
| 6,839,660 | B2 * | 1/2005 | Eryurek | G05B 23/0262 |
| | | | | 702/188 |
| 6,845,279 | B1 * | 1/2005 | Gilmore | G05B 19/406 |
| | | | | 340/426.1 |
| 7,054,696 | B2 * | 5/2006 | Crowell | B23D 59/008 |
| | | | | 700/83 |
| 7,065,456 | B1 * | 6/2006 | Butka | B25F 5/00 |
| | | | | 702/57 |
| 7,330,129 | B2 * | 2/2008 | Crowell | B25B 23/14 |
| | | | | 318/479 |
| 7,421,426 | B2 * | 9/2008 | Berstis | G06F 16/951 |
| 7,590,029 | B2 * | 9/2009 | Tingley | E21B 47/16 |
| | | | | 166/73 |
| 7,613,590 | B2 * | 11/2009 | Brown | A61B 5/0002 |
| | | | | 702/188 |
| 8,170,800 | B2 * | 5/2012 | Aamodt | E21B 44/00 |
| | | | | 702/9 |
| 8,406,697 | B2 * | 3/2013 | Arimura | G08C 17/02 |
| | | | | 173/180 |
| 8,412,179 | B2 * | 4/2013 | Gerold | B25C 1/08 |
| | | | | 455/423 |
| 9,256,988 | B2 * | 2/2016 | Wenger | B25F 5/00 |
| 9,756,402 | B2 * | 9/2017 | Stampfl | B25B 21/00 |
| 9,798,388 | B1 * | 10/2017 | Murali | G06F 3/016 |
| 9,831,816 | B2 * | 11/2017 | Nozawa | H02P 29/68 |
| 9,900,967 | B2 * | 2/2018 | Isaacs | H05B 47/175 |
| 10,131,042 | B2 * | 11/2018 | Mergener | B25F 5/00 |
| 10,295,990 | B2 * | 5/2019 | Dey, IV | B25F 5/00 |
| 10,339,496 | B2 * | 7/2019 | Matson | G06F 3/04842 |
| 10,345,797 | B2 * | 7/2019 | Conrad | B25B 23/1475 |
| 10,353,380 | B2 * | 7/2019 | Mader | G05B 19/4155 |
| 10,380,883 | B2 * | 8/2019 | Matson | H04L 67/306 |
| 10,396,573 | B2 * | 8/2019 | Furui | G08C 17/02 |
| 10,408,884 | B2 * | 9/2019 | Willey | G01R 31/3648 |
| 10,510,199 | B2 * | 12/2019 | Hoossainy | E05B 17/22 |
| 10,618,151 | B2 * | 4/2020 | Kanack | B25B 27/10 |
| 2002/0177792 | A1 * | 11/2002 | Ooba | A61H 23/0245 |
| | | | | 601/2 |
| 2003/0037423 | A1 * | 2/2003 | Siegel | B25B 23/14 |
| | | | | 29/407.01 |
| 2006/0074513 | A1 * | 4/2006 | DeRose | G07C 3/00 |
| | | | | 700/175 |
| 2007/0090788 | A1 * | 4/2007 | Hansford | H02J 7/007 |
| | | | | 320/107 |
| 2008/0252446 | A1 * | 10/2008 | Dammertz | B25F 5/02 |
| | | | | 340/539.27 |
| 2009/0040061 | A1 * | 2/2009 | Golunski | G07C 3/08 |
| | | | | 340/683 |
| 2009/0251330 | A1 * | 10/2009 | Gerold | B25C 1/08 |
| | | | | 340/12.22 |
| 2011/0049247 | A1 * | 3/2011 | Black | G01D 11/245 |
| | | | | 235/492 |
| 2011/0275424 | A1 * | 11/2011 | Schmid | A46B 15/0016 |
| | | | | 463/1 |
| 2012/0179077 | A1 * | 7/2012 | Tuck | A61H 19/44 |
| | | | | 601/46 |
| 2012/0318545 | A1 * | 12/2012 | Schreiber | B25F 5/00 |
| | | | | 173/1 |
| 2014/0005820 | A1 | 1/2014 | Roehm | |
| 2016/0175976 | A1 * | 6/2016 | Denis | B23K 9/10 |
| | | | | 219/130.1 |
| 2017/0300028 | A1 * | 10/2017 | Yamashita | G06F 9/30032 |
| 2018/0318999 | A1 * | 11/2018 | Lovelass | B25F 5/001 |
| 2019/0324116 | A1 * | 10/2019 | Bergkvist | B25J 9/1694 |

FOREIGN PATENT DOCUMENTS

| | | |
|---|---|---|
| CN | 101450476 A | 6/2009 |
| CN | 102574281 A | 7/2012 |
| DE | 20 2005 017 962 U1 | 4/2006 |
| DE | 10 2013 211 228 A1 | 12/2014 |
| EP | 1 136 188 A2 | 9/2001 |
| EP | 2 868 437 A1 | 5/2015 |
| JP | 4169000 A | 6/1992 |
| JP | H04-169000 A | 6/1992 |
| JP | 2002267740 A * | 9/2002 |
| JP | 2006-67726 A | 3/2006 |
| JP | 2009-083039 A | 4/2009 |
| WO | 2014/198679 A2 | 12/2014 |

\* cited by examiner

COMMUNICATION UNIT FOR AN ELECTRICAL MACHINE TOOL, ELECTRICAL MACHINE TOOL SYSTEM AND METHOD

This application is a 35 U.S.C. § 371 National Stage Application of PCT/EP2016/071037, filed on Sep. 7, 2016, which claims the benefit of priority to Serial No. DE 10 2015 217 826.9, filed on Sep. 17, 2015 in Germany, the disclosure of which is incorporated herein by reference in its entirety.

The disclosure relates to a communication facility for an electric power tool, in particular a hand-held power tool, which has at least one electric actuator and a control unit for triggering the electric actuator, comprising a transmission facility, assigned to the power tool, for transmitting data, and comprising a receiving facility, assigned to a mobile or stationary facility, for receiving the data.

The disclosure additionally relates to an electric tool system for such an electric tool, and to a method for operating a communication facility or an electric tool as described above.

BACKGROUND

Communication facilities of the type mentioned at the outset are known from the prior art. Power tools, in particular hand-held power tools, are usually understood to be stand-alone appliances that themselves provide all control and information functions, such that the user can perform control inputs and read out information directly on the power tool. Due to the networking of products among one another by means of the so-called Internet of Things, new possibilities are being made available, by which it becomes possible for information to be output or controls to be input in a decentralized manner, i.e. separate from the power tool. For example, this enables the power tool to be remotely operated by an external, or separate, facility, or its operating status to be checked. Communication facilities, which use differing data transmission possibilities, are used for transmitting the data. Thus, communication facilities are known that transmit data wirelessly, by infrared or by visible light. Wired connections of communication facilities are also known.

In the case of the known communication facilities, it is disadvantageous that, in addition to electronics already present in the power tool, it is additionally necessary to integrate a transmission facility that, for example, wirelessly transmits operating data of the power tool to the separate facility.

SUMMARY

The communication facility according to the disclosure has the advantage that means already present in the power tool are used for transmitting the data. Consequently, it is possible to dispense with the addition and design planning of an additional transmission facility. A particularly compact and inexpensive solution is offered, by which it is possible to transmit data wirelessly from the power tool to the separate facility. For this purpose, it is provided according to the disclosure that the receiving facility has at least one microphone, and the control unit, together with the electric actuator, forms the transmission unit, and for the purpose of transmitting data triggers the electric actuator to generate an acoustic signal to be picked up by the microphone. The communication facility thus uses the acoustic transmission of data. For this purpose, the control unit triggers the electric actuator in such a manner that the latter generates an audio signal, or one or more defined sounds, which can be picked up by the microphone of the receiving facility and evaluated. Thus, according to the disclosure, the transmission unit of the communication facility is formed by the control unit and the electric actuator together. Consequently, elements that are already present in the power tool are used for data transmission. The result, that data of the electric power tool are transmitted acoustically, is achieved solely by the programming of the control unit for corresponding triggering of the electric actuator.

According to a preferred development of the disclosure, it is provided that the control unit has power electronics, having at least one switching element, in particular a power semiconductor switch, that can be actuated electrically. By triggering of the power electronics, in particular the switching element, the electric actuator is easily triggered for the purpose of generating the sounds. The use of power semiconductor switches renders possible particularly rapid switching operations, which result in selective sound generation, such that a high resolution can be achieved in respect of the information content of the acoustic signal.

Particularly preferably, the electric actuator is realized as an electric motor. The control unit can excite the electric motor, for example, to selectively generate acoustic information that can be picked up by the microphone of the receiving facility. In this case, in particular, a housing of the power tool is also used as an acoustic amplifier and/or conductor. Alternatively, it may also be provided that the electric actuator is an electric magnetic actuator that, for example, actuates a valve or the like. By appropriate triggering of this electric actuator, also, it is possible to selectively generate an acoustic signal that can be picked up by the microphone and evaluated.

The electric tool system according to the disclosure is characterized by the communication facility according to the disclosure. For this purpose, the control unit and the electric actuator of the electric hand-held tool together form the transmission facility, and the mobile or stationary facility has the associated receiving facility, having a microphone. The aforementioned advantages are thereby obtained. Further features and advantages are disclosed, in particular, by the preceding description and the claims.

It is provided, particularly preferably, that the facility is realized as a mobile computer or mobile telephone. Consequently, the user, for example by running a corresponding program or application on their mobile telephone or mobile computer, can easily use the microphone of the mobile computer or mobile telephone, which is present in any case, to evaluate the sounds generated by the electric tool in order, for example, to receive and evaluate operating data of the electric tool.

The method according to the disclosure is characterized in that, for the purpose of transmitting data, the electric actuator is triggered to generate an acoustic signal, which is picked up by the receiving facility and evaluated. The aforementioned advantages are thereby obtained.

It is provided, particularly preferably, that the electric actuator is triggered in such a manner that it generates sounds without actuation. Triggering without actuation in this context is to be understood to mean that the electric actuator, as a result of being triggered, does not execute the function actually assigned to it, such as, for example, actuating the valve or generating a torque, and instead merely generates a specific sound, or acoustic signal.

In particular, it is provided that the electric motor is triggered to generate the signal in such a manner that it is triggered without torque or rotation, i.e. it does not generate any torque or any rotation. The electric motor thus does not effect any actuation, e.g. driving of a tool. It is thereby ensured that, as a result of the transmission of the data, the power tool is in an operationally safe state and, in particular, no unwanted actuations are effected.

It is additionally preferably provided that the electric actuator, as an electric motor, is triggered by pulse-width modulation. This ensures simple and precise triggering of the electric motor, in particular for the purpose of generating the acoustic signal, or data, to be transmitted.

Further advantages and preferred features are disclosed, in particular, by the preceding description and by the claims.

BRIEF DESCRIPTION OF THE DRAWINGS

The disclosure is to be explained in greater detail in the following, on the basis of the drawing. There are shown for this purpose FIG. 1 an electric tool system, in a simplified representation, FIG. 2 a communication facility of the electric tool system, in a simplified representation, and FIG. 3 an example of a signal transmitted by the communication facility.

DETAILED DESCRIPTION

Figure 1:
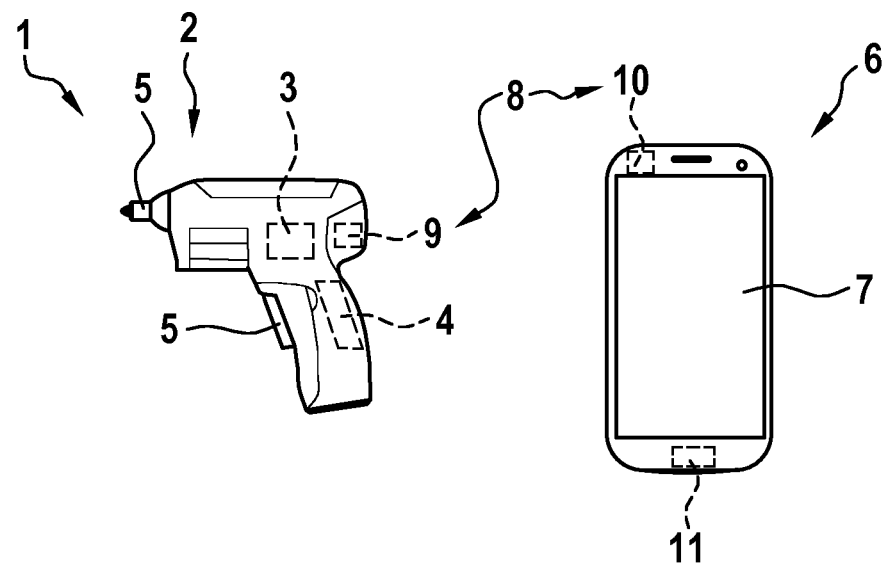

FIG. 1, in a simplified representation, shows an electric tool system 1, comprising an electric power tool 2, which is realized as a hand-held power tool. For this purpose, the electric power tool 2 has an electric actuator 3 in the form of an electric motor, and a control unit 4 which, in dependence on an actuation of an operating element 5, triggers the electric actuator 3 to drive a tool receiver 5 in one of two directions of rotation. The electric tool system 1 additionally has a facility 6, realized as a mobile telephone, which is separate from the electric power tool 2, and which has a touch-sensitive screen 7 for displaying information and for the input of control commands.

The electric tool system 1 additionally has a communication facility 8, which has a transmission facility 9, assigned to the electric power tool 2, and a receiving facility 10, assigned to the facility 6. The receiving facility 10 has a microphone 11, in this case the microphone 11 of the mobile telephone 6, which in normal operation is used to pick up speech.

The transmission facility 9 is formed by the control unit 4 and the electric motor. The control unit 4 is designed to trigger the electric actuator 3 to transmit data, in such a manner that the latter generates one or more sounds to form an acoustic signal, without driving of the tool receiver 5 being effected in this case. For this purpose, the control unit 4 triggers by pulse modulation, for example, power electronics 15 connected upstream from the electric motor in such a manner that puts the electric motor 3 into vibrational motion. Alternatively, the control unit 4 triggers the electric motor in such a manner that, entirely without motion of its own, solely as a result of the electrical triggering, generates an acoustic signal that can be picked up by the microphone 11 of the receiving facility 10. If the generated acoustic signal is sufficiently loud, the receiving facility 10 picks up the acoustic signal and evaluates it, in order to read out the data transmitted by the transmission facility 9.

Figure 2:
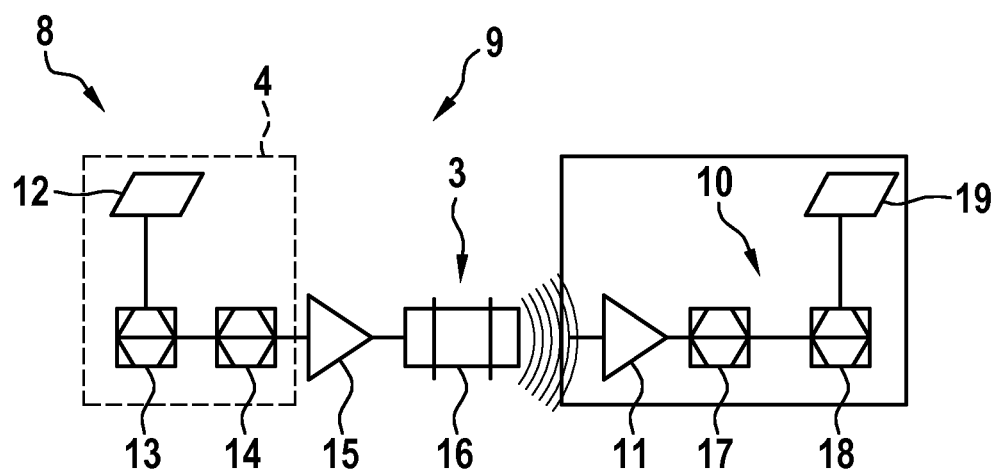

In connection with this, FIG. 2 shows the communication facility 8, in a simplified partial view.

The control unit 4 has means or a facility 12 for acquiring current operating data of the electric power tool 2. For example, one or more temperature values of differing components of the electric power tool 2 are acquired by means of the facility 12. It is also conceivable to acquire the charge state of a rechargeable battery of the electric power tool 2 by means of the facility 12. It is also conceivable for an existing current, a voltage or also an acceleration of the electric motor to be acquired. Moreover, the facility 12 can also read out, for example, a serial number, a machine type, an elapsed operating period, error messages or the like from a memory of the control unit 4.

The data acquired by the facility 12 are, in particular, optionally or according to requirement, brought by an encoding facility 13 into a format that is suitable for data transmission by means of the transmission facility 9. If necessary, the encoding may also be expanded by error correction.

A facility 14 prepares the formatted data, which exist, in particular, as a data packet, for acoustic transmission. In particular, it is provided that, for this purpose, the data packet is subjected to frequency shift keying (FSK). Advantageously, the digital data to be transmitted is thereby brought into a form suitable for acoustic data transmission. In particular, in this case a carrier frequency of a periodic sinusoidal oscillation is altered between a set of differing frequencies that represent the individual transmission symbols, or items of information. However, other modulation methods may also be used.

The control unit 4 triggers the power electronics 15 of the actuator 3, or electric motor 16. The power electronics 15 in this case effects pulse-width modulated triggering of the electric motor 16. The duty cycle of the pulse-width modulation in this case is selected in such a manner that the electric motor 16, on the one hand, does not begin to rotate and, on the other hand, generates an acoustic signal as previously described. In particular, the electric motor 16 is excited to a motion that mechanically generates the acoustic signal as required. For this purpose, the electric motor 16 may be triggered, for example, in such a manner that it vibrates instead of rotating. This mechanical motion generates sound waves, which are radiated directly or indirectly. If necessary, the sound waves are amplified by a housing of the electric power tool 2. In FIG. 2, the sound waves are represented in simplified form, as curved lines.

The microphone 11 of the receiving facility 10 picks up the sound waves, which reach the microphone 11 directly or indirectly, for example via an intermediate medium. A demodulation facility 17 converts the acoustic signal back into digital data/values, which are translated or decoded by a decoding facility 18 and provided in readable form to a facility 19. The facility 19 may be, for example, a control unit of the mobile telephone 6 that displays the revealed data to the user via the screen 7.

By means of the presented communication facility 8, information can thus be transmitted wirelessly, by an acoustic signal, from the electric power tool 2 to the facility 6, and displayed there. In this case, a loudspeaker facility for generating the acoustic signal is not provided. Instead, components already present in the electric power tool 2 are used to generate the acoustic signal. There is thereby provided a simple and compact communication facility 8 that can easily also be integrated into an existing electric power tool by appropriate programming of the control unit 4. Any terminal device that has a microphone for picking up the acoustic signal may be used to receive the data. It is thus possible, for example, for the user to load or install a corresponding application onto their mobile telephone, to enable them to read out information of their electric power tool 2. For the user, this is also convenient and inexpensive.

Figure 3:
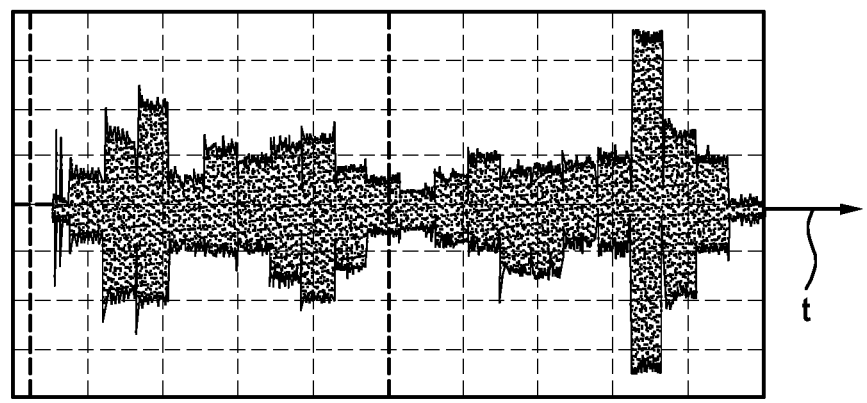

A transmitting audio signal is shown exemplarily in FIG. 3. Advantageously, the communication facility 8 works with a 32-letter alphabet. Each letter is represented by a different frequency of the audio signal. Preferably, an audio signal, or a data transmission, comprises 20 letters. These letters define the start of the audio signal, the data to be transmitted, and a correction error. Clearly, other encodings of the audio signal may also be used. The loudness of the audio signal increases with the degree of pulse-width modulation. It is preferred, as already mentioned, that the duty factor be low enough for the electric motor 16 not to be put into a rotational motion. The duty factor in this case is preferably determined in dependence on the inertia of the mechanical components of the electric power tool 2 that are to be driven. In the case of the present exemplary embodiment, with a hand-held screwdriver, a duty factor of 13%, for example, is advantageous.

The audio signal shown in FIG. 3 can advantageously be optimized in respect of its quality by increasing the duty factor and by generating a sinusoidal signal.

The inductivity of the electric motor 16 can be used in this case as a low-pass filer for smoothing steep pulse edges.

As can be seen from FIG. 3, the audio signal has differing amplitudes for differing frequencies. This is due to the non-linearity of the electric motor 16 and the resonance of the housing of the electric power tool 2. This can be improved by individually adapting the duty factor for each frequency.

The communication facility 8 may be used both with battery-operated and with cable-connected electric power tools. In the case in which the electric actuator 3 may be switched on and off at any time, frequency modulation represents a good choice for data transmission. By a simple adaptation of software, the transmission facility 9 may be used in almost any, in particular battery-operated, electric power tool 2. The communication facility 8 may be used, for example, at the end of the production line, to test the manufactured product. Furthermore, it is possible to use the communication facility to perform a product identification, for example to poll a product name, a software and/or hardware version, Furthermore, users may use the installed application to obtain further information about the electric power tool 2, which is, for example, a display item in a store. The communication facility 8 may also be used to easily read out faults of the electric power tool 2 and, for example, to forward these to a service centre. Moreover, data concerning the operation of the electric power tool 2 may be acquired continuously and used for market analysis. For this purpose, the data are transmitted, for example, directly from the mobile telephone to a central server, where the data can be collected and evaluated. The communication facility 8 may also be used to generate warning signals, for example if the electric power tool 2 reaches a critical temperature, or is in danger of reaching a critical temperature, in which case the operation of the electric power tool 2 is then preferably adjusted automatically. The transmission facility 9 may use differing acoustic signals to communicate differing events.

The audio signal may also be used to operate interactive operating instructions, such that, for example in the event of a fault, the electric tool uses a corresponding acoustic signal to guide the user to a particular page in the operating instructions that is relevant to the current fault. The electric power tool 2 may also be identified by the communication facility 8, and located by means of the mobile telephone. In principle, the transmission facility can transmit measured or calculated data, which may be used to calculate or estimate further values such as, for example, an estimated remaining operating time, the number of screws that have been screwed-in or that remain to be screwed-in, the charge state, voltage, temperature, the general state of a battery, and/or an estimated wait time after a fault, in particular a load.

By means of the communication facility 8, the electric power tool 2 can transmit information to the user, the bandwidth of the information transmission advantageously being between 0.3 kHz and 3 kHz. It is also possible, by means of the communication facility 8, for the electric power tool 2 to wirelessly trigger an accessory such as, for example, an ancillary unit that can be attached to the electric power tool 2, by means of the acoustic signal. For example, the headphone socket of the mobile telephone may also be connected to a charging connection of the electric power tool 2, if necessary with an interposed adapter.

The control unit, which in particular has a microcontroller, may be used as a digital amplifier. The electric motor may be used directly as a vibration loudspeaker, as described previously. Alternatively, however, the motor could also be connected to a loudspeaker facility in order, for example, to amplify the acoustic signal.

The invention claimed is:

1. A communication system for an electric power tool, comprising:
   an electric motor of the electric power tool, the electric motor being configured to rotate a tool receiver of the electric power tool;
   a control unit of the electric power tool, the control unit being configured to receive data and operate the electric motor so as to generate an acoustic signal that encodes the data by causing the electric motor to vibrate without rotation of the tool receiver; and
   a microphone of a mobile or stationary device, the mobile or stationary device being configured to receive the acoustic signal generated by the electric motor in a non-contact wireless manner using the microphone and decode the acoustic signal to recover the data.

2. The communication system as claimed in claim 1, wherein the control unit has power electronics with at least one switching element that is electrically actuatable.

3. The communication system as claimed in claim 2, wherein the at least one switching element includes a power semiconductor switch.

4. An electric tool system, comprising:
   an electric power tool having at least one electric motor and a control unit, the electric motor being configured to rotate a tool receiver of the electric power tool, the control unit being configured to receive data and operate the at least one electric motor so as to generate an acoustic signal that encodes the data by causing the electric motor to vibrate without rotation of the tool receiver;
   a mobile or stationary facility having a microphone, the mobile or stationary device being configured to receive the acoustic signal generated by the at least one electric motor in a non-contact wireless manner using the microphone and decode the acoustic signal to recover the data.

5. The electric tool system as claimed in claim 4, wherein the mobile or stationary facility is a mobile computer or a mobile telephone.

6. The electric tool system as claimed in claim 4, wherein the electric power tool is a hand-held power tool.

7. A method of operating a communication system for an electric power tool, the electric power tool having an electric motor and a control unit, the electric motor being configured to rotate a tool receiver of the electric power tool, the method comprising:
  receiving data with the control unit;
  operating, with the control unit, the electric motor so as to generate an acoustic signal that encodes the data by causing the electric motor to vibrate without rotation of the tool receiver;
  receiving, with a microphone of a mobile or stationary facility, the acoustic signal generated with the electric motor in a non-contact wireless manner; and
  decoding, with the mobile or stationary facility, the acoustic signal to recover the data.

8. The method as claimed in claim 7, the operating the electric motor further comprising:
  operating the electric motor such that the electric motor generates the acoustic signal without actuation.

9. The method as claimed in claim 7, the operating the electric motor further comprising:
  operating the electric motor such that the electric motor generates the acoustic signal without torque.

10. The method as claimed in claim 7, the operating the electric motor further comprising:
  operating the electric motor using pulse-width modulation.

* * * * *